US006695897B1

(12) United States Patent
Miksic et al.

(10) Patent No.: US 6,695,897 B1
(45) Date of Patent: Feb. 24, 2004

(54) CORROSION RESISTANT SYSTEM FOR PERFORMANCE DRILLING FLUIDS UTILIZING FORMATE BRINE

(75) Inventors: Boris A. Miksic, North Oaks, MN (US); Alla Furman, Shoreview, MN (US); Margarita Kharshan, Little Canada, MN (US); Jostein Braaten, Prosgrunn (NO); Håkon Leth-Olsen, Skien (NO)

(73) Assignee: Cortec Corporation, St. Paul, MN (US)

( * ) Notice: Subject to any disclaimer, the term of this patent is extended or adjusted under 35 U.S.C. 154(b) by 0 days.

(21) Appl. No.: 10/329,793

(22) Filed: Dec. 26, 2002

(51) Int. Cl.[7] ................................................ C23F 11/06
(52) U.S. Cl. ............................... 106/14.15; 106/14.24; 106/14.42; 106/14.44; 422/13; 507/939
(58) Field of Search ....................... 106/14.15, 14.24, 106/14.42, 14.44; 422/13; 507/939

(56) References Cited

U.S. PATENT DOCUMENTS 5,804,535 A * 9/1998 Dobson et al. ............. 507/111
6,432,885 B1 * 8/2002 Vollmer ..................... 507/236

* cited by examiner

*Primary Examiner*—Anthony J. Green
(74) *Attorney, Agent, or Firm*—Haugen Law Firm PLLP

(57) ABSTRACT

A corrosion inhibited formulation for drilling compositions consisting essentially of an environmentally friendly corrosion inhibitor blended with an alkali metal formate. The corrosion inhibitor is prepared pursuant to a process including the steps of:

(1) preparing a reactant mixture comprising a fatty acid such as soya fatty acid or tall oil fatty acid with polyfunctional amines;

(2) subjecting the reactant mixture to a temperature of between about 130 and 170 for a period sufficient to substantially complete the reaction to obtain a fatty acid amido amine product;

(3) solubilizing the reactant product with an organic acid such as acetic to produce a product that is substantially completely soluble in aqueous solutions; and (4) blending the water soluble inhibitor salts into the buffered formate media.

4 Claims, No Drawings

CORROSION RESISTANT SYSTEM FOR PERFORMANCE DRILLING FLUIDS UTILIZING FORMATE BRINE

BACKGROUND OF THE INVENTION

The present invention relates generally to an improved corrosion resistant systems for use in with high density, high performance drilling and completion fluids and in particularly those high performance drilling and completion operations that utilize formate brine systems. Formate brine systems are frequently employed in conjunction with drilling operations to aid and facilitate the drilling operation. Of particular interest are those downhole or slimhole drilling operations which are frequently utilized in offshore drilling. The use of formate brine systems in such drilling operations, while advantageous for expediting the operation, have also been found to cause some degree of general corrosion as well as stress corrosion cracking (SCC) on steel.

Alkali bromate technology is finding use in areas where environmental concerns are paramount particularly in arctic regions such as offshore northern Norway. The alkali-metal salts of formic acid, particularly potassium formate is readily available, non-hazardous, and readily biodegradable (70% degraded in 28 days). As indicated above, corrosion studies have shown the occurrence of some general corrosion and also some slight corrosion cracking (SCC) effects on steel. It has been found that a significant reduction in the corrosion normally occurring in the system may be achieved by means of blending the alkali salts of formic acid such as potassium formate with inhibitors that are environmentally friendly and function in combination with the alkali bromates employed in drilling operations.

In order to perform the function of inhibiting corrosion in the severe service conditions of drilling, particularly downhole drilling, effective corrosion inhibitors must have the capability of forming durable films on the surfaces of the steel components. Because of the harsh conditions which must be met, the combined film forming and corrosion inhibiting functions must be achieved without creating conditions which could be expected to cause a deterioration in the environment.

It has been determined that certain corrosion inhibitors advantageously added to alkali formate brines including potassium formate brines serve to control corrosion in the high pH basic carbon dioxide environment where the formate brines are being utilized in the drilling operation. The corrosion inhibitors of the present invention and which that are most useful combine the function of corrosion inhibition with formation of durable and tough films on the various metallic surfaces present in well drilling and operation.

The alkali salts of formic acid in drilling fluids have the unique feature of being environmentally friendly this being a rigid requirement in offshore drilling in the Artic regions. The high density formate fluids also facilitate faster drilling, as the plastic viscosity of the mud becomes lower due to the high solubility and density of the bromate salts. The effect of the equivalent circulating density and the lower downhole pressures result in greater drilling efficiency. This is very important in downhole drilling where pipe diameters are necessarily reduced and downhole pressure losses must be controlled.

Because of the high pH of the formate systems, steps must be taken to maintain the pH within practical limits. This requires constant buffering with carbonate salts in order to maintain solubility. Even with the use of such buffered solutions a certain amount of corrosion and pitting arises on the drilling equipment. In accordance with procedures undertaken pursuant to the present invention, tests have determined that selected inhibitors employed in connection with the invention are very effective in these systems.

SUMMARY OF THE INVENTION

In accordance with the present invention, it has been determined that when exposed to conditions encountered in downhole drilling, potassium formate brines blended with selected inhibitors of the present invention significantly reduce the rate of corrosion on both carbon and chromium steel. In certain applications, small amounts of these inhibitors in buffered potassium formate solutions virtually prevent the occurrence of corrosion. In certain applications, blends containing more than about 0.3% inhibitor reduce the corrosion on chrome steel to less than 30% of that of the control, while with 0.5%, the corrosion was reduced to 0.2% of the control. Similar reductions were experienced with carbon steel.

Non-buffered potassium formate/inhibitor solutions of the present invention yielded similar corrosion rate reductions. Test results clearly demonstrated that the combination of buffering and the addition of inhibitor to the alkali formate solutions provided the most effective corrosion control system for downhole drilling applications. More importantly, results showed that reductions of corrosion rates in both buffered and non-buffered alkali formate solutions are achieved by adding selected corrosion inhibition molecules to the formate solutions.

Therefore, it is a primary object of the present invention to provide an improved system for use in oil drilling applications, particularly downhole drilling applications, wherein a drilling fluid is formulated utilizing an alkali formate brine together with selected environmentally friendly corrosion inhibitors, with the resultant fluid being highly compatible with drilling operations.

It is yet a further object of the present invention to provide an improved drilling fluid adapted for use in offshore drilling operations, particularly downhole drilling operations wherein the drilling fluid comprises buffered alkali formate solutions and a corrosion inhibitor comprising an amido amine salt formed as a reaction product of fatty acid derivatives.

It is yet a further object of the present invention to provide an improved corrosion resistant drilling fluid system which employs fatty acid amido amine salts in combination with a buffered alkali formate solution.

Other and further objects of the present invention will become apparent to those skilled in the art upon a study of the following specification and appended claims.

DESCRIPTION OF THE PREFERRED EMBODIMENT

In accordance with the preferred embodiment of the present invention, amido amine salts as described in the following examples have been found to be the most effective corrosion inhibition molecules that can be utilized in formate solutions, inasmuch as the high pH environment does not hydrolyze the amido group. In this connection, the amido group can be prepared by reaction of amines with either the anhydride, the partial esters, or directly from the reaction of a fatty acid with polyfunctional amines. Anhydrides prepared by reaction of unsaturated acids with maleic anhydride are available commercially under the trade designation "Tenax 2010", available from the Chemical Division of Westvaco, Charleston, S.C. The partial ester reaction products are available from the same entity under the trade designation "Tenax WS". Olefinic anhydrides available from Albemarle are also useful as a precursor of amido amines when reacted with the appropriate amine. The hydrocarbon portion of the final product however is not as environmentally friendly as the fatty acid derivatives.

EXAMPLE I

Soya fatty acid was reacted with N-ethylethylenediamine pursuant to the following:

| Component | Parts by Volume |
| --- | --- |
| Soya fatty acid | 284 |
| N-ethylethylenediamine | 88. |

The reactants were combined, and subjected to a temperature of 150° C. for a period of 4 hours, at which time the reaction was deemed substantially complete and the monoamido amine reaction isolated.

The reaction product was solubilized by forming the salts with acids in the following ratios:

| Component | Parts by Volume |
| --- | --- |
| Soya amido amine | 4–6% |
| Acetic acid | 0.5–1% |
| Water | balance. |

EXAMPLE II

The reaction of the fatty acid anhydride Tenax 2010 which is obtained from the Diels Alder reaction of maleic anhydride and a tall oil acid with amines produces an amido di-acid molecule which can be solubilized with additional ethanolamine molecules as follows:

| Component | Parts by Volume |
| --- | --- |
| Tenax 2010 (reacted) | 0.5–1% |
| 2-amino-2-methyl-1-propanol | 2–5% |
| Water | balance. |

EXAMPLE III

The reaction of the acid anhydride with three parts of ethanolamine produced an amido di-acid product that was solubilized as follows:

| Component | Parts by Volume |
| --- | --- |
| Tenax 2010 (reacted) | .5–1% |
| Monoethanolamine | 2–3% |
| Water | balance. |

Tenax 3520 is the ethylene glycol acid ester produced by the partial reaction of the glycol with Tenax 2010. After reaction with ethanolamine it is solubilized easily with more ethanolamine to form an effective inhibitor and film former.

EXAMPLE IV

| Component | Parts by Volume |
| --- | --- |
| Tenax 3520 (reacted) | .5–1% |
| Monoethanolamine | 1–2% |
| Water | balance. |

EXAMPLE V

| Component | Parts by Volume |
| --- | --- |
| Albemarle Alkenyl Succinic Amido amine | .5–1% |
| N,N-dimethylethanolamine | 2–3% |
| Water | balance. |

Test Procedures

Method

Corrosion test in high-pressure vessels and pH measurements

Materials

Potassium Formate and Potassium Formate with buffer;

Steel Panels: Carbon steel and chromium steels;

High pressure test kit—vessels, compressed carbon dioxide and nitrogen;

pH/ISI meter model 710A, manufactured by 'Orion'.

Procedure

1. During preliminary screening the performance of several different inhibitors described in the Examples were evaluated in buffered formate brines. Screening was at a concentration level of 0.3% by weight and the tests were performed in dynamic condition. Steel panels were immersed in brine and stirred at a temperature of about 90° C. in an open vessel. Weight loss of these panels was evaluated after 24 hours.

2. Tests in the pressure vessels were performed according to the follow protocol.

3. Metal panels were polished with sand paper #600 grit, rinsed with methanol, air dried and weighed. The best performing inhibitor was added to Potassium Formate brines at concentration level of 0.5% by weight and the panels were immersed in brines and the vessels were sealed. Nitrogen was compressed into the vessels at 0.6 bar and released 2 times, before carbon dioxide was compressed into the vessels at 5 bar. After 168 hours at 82–104° C. the vessels were opened, panels removed, cleaned from the corrosion product and weight loss evaluated.

4. The pH levels of the solutions before and after tests were measured according to the standard procedure.

Test Results

TABLE I

Corrosion protection provided by inhibitor in buffered Potassium Formate Solution:

| Material | pH before test | pH after test | Chromium Steel, weight loss, g | Carbon Steel, weight loss, g | Protective Power Z, % Chromium Steel | Protective Power Z, % Carbon Steel |
|---|---|---|---|---|---|---|
| K Formate with Buffer + 0.3% Inhibitor | 10.820 | 9.205 | 0.1288 | 0.6833 | 72.5 | 72.5 |
| K Formate with buffer + 0.5% Inhibitor | 10.820 | 9.261 | 0.0011 | 0.0631 | 99.8 | 97.5 |
| K Formate with buffer (Control) | 10.830 | 9.237 | 0.4681 | 2.4843 | — | — |

TABLE II

Corrosion protection provided by inhibitor in non-buffered Potassium Formate Solution:

| Material | pH before test | pH after test | Chromium Steel, weight loss, g | Carbon Steel, weight loss, g | Protective Power Z, % Chromium Steel | Protective Power Z, % Carbon Steel |
|---|---|---|---|---|---|---|
| K Formate + 0.3% Inhibitor | 11.274 | 8.805 | 0.5598 | 4.4044 | 45.7 | 59.9 |
| K Formate + 0.5% Inhibitor | 11.852 | 8.705 | 0.4424 | 0.5812 | 58.8 | 94.7 |
| K Formate (Control) | 9.222 | 8.048 | 1.0303 | 10.9955 | — | — |

It will be appreciated that various modifications may be made in the method and formulations of the present invention without departing from the spirit and scope of the present invention.

What is claimed is:

1. A corrosion inhibitor formulation for drilling compositions consisting essentially of an environmentally friendly corrosion inhibitor blended with an alkali metal formate wherein said corrosion inhibitor is prepared pursuant to a process including the steps of:
   (a) reacting vegetable based fatty acid anhydrides with amines to form amido acids, said amido acids being solubilized with amines by:
      (1) reacting a fatty acid anhydride with an ethanolamine to form an amide linkage;
      (2) adding additional amine to neutralize carboxyl groups formed thereon to thereby achieve water solubility in an inhibitor salt;
      (3) blending the water soluble inhibitor salts into buffered alkali metal formate drilling media.

2. A corrosion inhibitor formulation for drilling compositions consisting essentially of an environmentally friendly corrosion inhibitor blended with an alkali metal formate wherein said corrosion inhibitor is prepared pursuant to a process including the steps of:
   (a) preparing a reactant mixture comprising a fatty acid selected from the group consisting of soya fatty acid and tall oil fatty acid, with polyfunctional amines;
   (b) subjecting said reactant mixture to a temperature of between about 130 and 170° C. for a period sufficient to substantially complete the reaction to obtain a fatty acid amido amine product;
   (c) solubilizing said reactant product with an organic acid to produce an inhibitor salt that is substantially completely soluble in aqueous solutions;
   (d) blending the water soluble inhibitor salt into buffered alkali metal formate media.

3. A corrosion inhibitor formulation as in claim 1 wherein said water soluble inhibitor salts are blended with said alkali formate at a concentration between about 0.1% and about 2.0% by weight.

4. A corrosion inhibitor formulation as in claim 2 wherein said water soluble inhibitor salts are blended with said alkali formate at a concentration between about 0.1% and about 2.0% by weight.

* * * * *